US005710214A

United States Patent [19]
Chou et al.

[11] Patent Number: 5,710,214
[45] Date of Patent: Jan. 20, 1998

[54] THERMOSETTING POWDER COATING COMPOSITIONS

[75] Inventors: Chun-Tzer Chou; Robert B. Barbee, both of Kinsport, Tenn.

[73] Assignee: PPG Industries, Inc., Pittsburgh, Pa.

[21] Appl. No.: 640,249

[22] Filed: Apr. 30, 1996

Related U.S. Application Data

[63] Continuation of Ser. No. 227,220, Apr. 13, 1994, abandoned.

[51] Int. Cl.$^6$ .................................................. C08F 8/30
[52] U.S. Cl. ......................... 525/124; 525/221; 525/222; 525/403; 525/404; 525/408; 525/528; 525/529; 525/530; 515/533; 428/413; 428/423.1; 427/372.2; 427/586; 427/388
[58] Field of Search .................................. 525/124, 221, 525/222, 403, 404, 408, 528, 529, 550, 533; 427/372.2, 386, 388.1; 428/413, 423.1, 500

[56] References Cited

U.S. PATENT DOCUMENTS

| | | | |
|---|---|---|---|
| 4,281,076 | 7/1981 | Kamimura | 525/124 |
| 4,522,981 | 6/1985 | Geist | 525/124 |
| 4,539,218 | 9/1985 | Geist | 427/27 |
| 4,818,791 | 4/1989 | Murakami et al. | 525/124 |
| 4,824,909 | 4/1989 | Togo et al. | 525/124 |
| 5,244,944 | 9/1993 | Botl et al. | 523/461 |

FOREIGN PATENT DOCUMENTS

| | | |
|---|---|---|
| 0 045 040 | 2/1982 | European Pat. Off. . |
| 60-120764 | 6/1985 | Japan . |

*Primary Examiner*—E. Rollins Buffalow
*Attorney, Agent, or Firm*—Kenneth J. Stachel

[57] ABSTRACT

Provided are novel thermosetting powder coating compositions which are useful for coating metal articles and protecting such articles from acidic corrosion. The compositions are comprised of an epoxy containing acrylic copolymer crosslinked with both an aliphatic dibasic acid and a blocked polyisocyanate.

26 Claims, No Drawings

THERMOSETTING POWDER COATING COMPOSITIONS

This application is a continuation of application Ser. No. 08/227,220, filed Apr. 13, 1994, now abandoned.

FIELD OF THE INVENTION

This invention belongs to the field of thermosetting powder coating compositions. In particular, it relates to a powder coating having superior acid etch resistance.

BACKGROUND OF THE INVENTION

Plastic materials used in the manufacture of powder coatings are classified broadly as either thermosetting or thermoplastic. In the application of thermoplastic powder coatings, heat is applied to the coating on the substrate to melt the particles of the powder coating and thereby permit the particles to flow together and form a smooth coating.

Thermosetting coatings, when compared to coatings derived from thermoplastic compositions, generally are tougher, more resistant to solvents and detergents, have better adhesion to metal substrates and do not soften when exposed to elevated temperatures. However, the curing of thermosetting coatings has created problems in obtaining coatings which have, in addition to the above-stated desirable characteristics, good smoothness and flexibility. Coatings prepared from thermosetting powder compositions, upon the application of heat, may cure or set prior to forming a smooth coating, resulting in a relatively rough finish referred to as an "orange peel" surface. Such a coating surface or finish lacks the gloss and luster of coatings typically obtained from thermoplastic compositions. The "orange peel" surface problem has caused thermosetting coatings to be applied from organic solvent systems which are inherently undesirable because of the environmental and safety problems occasioned by the evaporation of the solvent system. Solvent-based coating compositions also suffer from the disadvantage of relatively poor percent utilization, i.e., in some modes of application, only 60 percent or less of the solvent-based coating composition being applied contacts the article or substrate being coated. Thus, a substantial portion of solvent-based coatings can be wasted since that portion which does not contact the article or substrate being coated obviously cannot be reclaimed.

The present invention as described below relates to powder coatings suitable for use in high performance automotive coatings. Coatings that are subjected to outdoor exposure are now expected to provide the customer with a finish that has excellent weatherability and also will prevent or minimize etch and water-spot damage caused by environmental conditions. It has now been found that a powder coating based on glycidyl methacrylate and having excellent weatherability will exhibit markedly improved acid etch resistance by the addition of polyisocyanate.

Japanese Patent 60-120764 (Dainippon Ink and Chemicals, Inc.) describes glycidyl methacrylate powder coatings based on a blend of glycidyl methacrylate resins, polyester resins, and polyisocyanates.

U.S. Pat. No. 4,522,981 describes acrylate copolymer having both blocked polyisocyanate and glycidyl groups. A glycidyl containing copolymer having free hydroxyl groups is reacted with a partially blocked polyisocyanate.

U.S. Pat. No. 4,539,218 describes acrylate copolymer modified with glycidyl esters and isocyanate blocked hydroxyalkyl acrylates.

U.S. Pat. No. 4,818,791 describes a blend of a polyester resin containing both carboxyl and hydroxyl groups, a glycidyl methacrylate resins which also contains hydroxyl groups, and polyisocyanates.

U.S. Pat. No. 4,824,909 describes a powder coating comprising a blend of a polyester resin, an acrylic resin containing both hydroxyl and glycidyl groups, and polyisocyanates.

SUMMARY OF THE INVENTION

The present invention provides thermosetting powder coating compositions comprised of a glycidyl acrylic resin, an aliphatic carboxylic acid, and a blocked polyisocyanate. The compositions, upon application and curing, provide coatings having significantly improved acid etch resistance over similar coatings which do not utilize a blocked polyisocyanate.

DETAILED DESCRIPTION OF INVENTION

This invention relates to a powder coating based on glycidyl methacrylate resins and cured with an aliphatic dibasic acid and a polyisocyanate such as HULS 1530. This coating exhibits excellent acid etch resistance. Thus, the present invention provides a powder coating composition comprising:

A. about 55 to 71 weight percent of a glycidyl functionalized acrylic copolymer comprised of
  1. about 10 to 40 percent by weight, based on the weight of the copolymer, of a monoethylenically unsaturated monomer having at least one epoxy group, and
  2. about 60 to 90 percent by weight, based on the weight of the copolymer, of at least one monoethylenically unsaturated monomer which is free of epoxy groups, wherein the copolymer has a number average molecular weight of about 1,000 to 8,000, a weight average molecular weight of about 2,000 to 16,000 and a glass transition temperature of 40° C. to 90° C., and B. about 9 to 14 weight percent of an aliphatic carboxylic acid having 2 to 3 carboxylic acid groups per molecule, and C. about 17 to 34 weight percent based on the total weight of A, B and C, of a blocked polyisocyanate.

Of course, in the above composition, it should be appreciated that the total weight percent of A, B and C will equal 100%.

The glycidyl copolymer resins, i.e., component A, are well known in the art and are commercially available as, for example, PD 7610, PD 6300, and PD 1700 manufactured by Anderson Chemical Development. Typical compositions are described in U.S. Pat. Nos. 4,042,645 and 4,346,144, incorporated herein by reference and are generally comprised of about 10 to 40 percent by weight of a monoethylenically unsaturated monomer having at least one epoxy group and 60 to 90 weight percent of one or more monoethylenically unsaturated monomers having no epoxy groups. Preferred monomers containing epoxy groups are glycidyl acrylate and glycidyl methacrylate. Preferred monomers having no epoxy groups are styrene and esters of acrylic or methacrylic acid such as methyl methacrylate, n-butyl methacrylate. Monomers may also be used that have hydroxyl functionality, such as hydroxyethyl methacrylate.

The glycidyl copolymer resin preferably has a number average molecular weight of 1,000 to 8,000, most preferably 2,000 to 5,000, and a weight average molecular weight of preferably 2,000 to 16,000, most preferably 4,000 to 12,000 as determined by gel permeation chromatography in tetrahydrofuran.

The glycidyl copolymer resin can be prepared by conventional solution, emulsion, or bead polymerization techniques using conventional polymerization catalysts.

In general, aliphatic carboxy-functional cross-linking agents are $C_3$–$C_{30}$ alkyl, alkenyl, or alkynyl compounds with two or more carboxylic acid functional groups. Preferred carboxy-functional cross-linking compounds can be described by the formula

$$H_2OC-[(CH_2)_n]-CO_2H,$$

wherein n is an integer of 1–10. Examples of such carboxy-functional cross-linking agents include polycarboxy alkyl compounds such as dodecanedioic acid, azelaic acid, adipic acid, 1,6-hexanedioic acid, succinic acid, pimelic acid, sebacic acid, maleic acid, citric acid, itaconic acid, aconitic acid, and the like. Further examples of suitable aliphatic dicarboxylic acids includes 1,2-, 1,3-, and 1,4-cyclohexane dicarboxylic acid. Aliphatic dicarboxylic acids may be used as crosslinking agents for the glycidyl copolymer resin.

The most readily-available, and thus the preferred, blocked polyisocyanate cross-linking agents or compounds are those commonly referred to as $\epsilon$-caprolactam-blocked isophorone diisocyanate, e.g., those described in U.S. Pat. Nos. 3,822,240, 4,150,211 and 4,212,962, incorporated herein by reference. However, the products marketed as $\epsilon$-caprolactam-blocked isophorone diisocyanate may consist primarily of the blocked, difunctional, monomeric isophorone diisocyanate, i.e., a mixture of the cis and trans isomers of 3-isocyanatomethyl-3,5,5-trimethylcyclohexylisocyanate, the blocked, difunctional dimer thereof, the blocked, trifunctional trimer thereof or a mixture of the monomeric, dimeric and/or trimeric forms. For example, the blocked polyisocyanate compound used as the cross-linking agent may be a mixture consisting primarily of the $\epsilon$-caprolactam-blocked, difunctional, monomeric isophorone diisocyanate and the $\epsilon$-caprolactam-blocked, trifunctional trimer of isophorone diisocyanate. The description herein of the cross-linking agents as "polyisocyanates" refers to compounds which contain at least two isocyanato groups which are blocked with, i.e., reacted with, another compound, e.g., $\epsilon$-caprolactam. The reaction of the isocyanato groups with the blocking compound is reversible at elevated temperatures, e.g., normally about 150° C., and above.

Alternatively, the blocked polyisocyanate may be a cross-linking effective amount of an adduct of the 1,3-diazetidine-2,4-dione dimer of isophorone diisocyanate and a diol having the structure

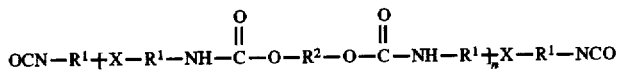

$$OCN-R^1+X-R^1-NH-\overset{O}{\underset{||}{C}}-O-R^2-O-\overset{O}{\underset{||}{C}}-NH-R^1+X-R^1-NCO$$

wherein $R^1$ is a divalent 1-methylene-1,3,3-trimethyl-5-cyclohexyl radical, i.e., a radical having the structure

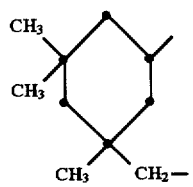

$R^2$ is a divalent aliphatic, cycloaliphatic, araliphatic or aromatic residue of a diol; and X is a 1,3-diazetidine-2,4-dionediyl radical, i.e., a radical having the structure

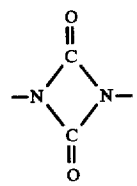

wherein the ratio of NCO to OH groups in the formation of the adduct is about 1:0.5 to 1:0.9, the mole ratio of diazetidinedione to diol is from 2:1 to 6:5, the content of free isocyanate groups in the adduct is not greater than 8 weight percent and the adduct has a molecular weight of about 500 to 4000 and a melting point of about 70° to 130° C.

The adducts of the 1,3-diazetidine-2,4-dione dimer of isophorone diisocyanate and a diol are prepared according to the procedures described in U.S. Pat. No. 4,413,079, incorporated herein by reference, by reacting the diazetidine dimer of isophorone diisocyanate, preferably free of isocyanurate trimers of isophorone diisocyanate, with diols in a ratio of reactants which gives as isocyanto:hydroxyl ratio of about 1:0.5 to 1:0.9, preferably 1:0.6 to 1:0.8. The adduct preferably has a molecular weight of 1450 to 2800 and a melting point of about 85° to 120° C. The preferred diol reactant is 1,4-butanediol. Such an adduct is commercially available under the name Hüls BF1540.

The amount of the blocked polyisocyanate cross-linking compound present in the compositions of this invention can be varied depending on several factors such as those mentioned hereinabove relative to the amount of components A, B and C which are utilized. Typically, the amount of cross-linking compound which will effectively cross-link the polymers to produce coatings having a good combination of properties is in the range of about 17 to 34 weight percent, preferably 24 to 31 weight percent, based on the total weight of components A, B and C.

Upon being heated to cure coatings of the composition, the blocked polyisocyanates are unblocked and it is believed that the isocyanate groups react with the hydroxy groups that are formed during the opening of the epoxy ring by the aliphatic acid crosslinker. The additional crosslinking provides improved acid etch resistance.

The marked improvement in acid etch by the addition of polyisocyanate to a glycidyl methacrylate powder coating is shown in Table 1 below. Coatings containing below 17% polyisocyanate have poorer acid etch resistance than coatings having 17 to 34% polyisocyanate.

Thus, as a further aspect of the present invention, there is provided a method for protecting a metal article which comprises coating the article with the compositions of the present invention, followed by heat-curing.

Conventional ultraviolet light stabilizers, such as Tinuvin 234, and hindered amine light stabilizers, such as Tinuvin 144 may also be used. Also, conventional dyes or pigments such as R960 titanium dioxide pigment marketed by Du Pont may be used as well as catalysts.

The components of the compositions according to this invention may be mixed by dry blending in a Henschel mixer, followed by compounding in a ZSK-30 Extruder (Werner & Pfleiderer) or APV twin screw extruder at 100-130 C., grinding, and screening to obtain powder with average particle size of about 35 microns. The powder can be electrostatically deposited on the substrate by use of a powder gun. After deposition, the powder is heated to a temperature sufficient to cause its particles to flow and fuse together to form a smooth, uniform surface. Coatings were prepared on 3 inch by 9 inch panels of 20-gauge, polished, cold rollsteel, the surface of which has been zinc phosphated (Bonderite 37, The Parker Company).

The melt blending should be carried out at a temperature sufficiently low to prevent the unblocking of the polyisocyanate cross-linking compound and thus avoiding premature cross-linking.

Typical of the additives which may be present in the powder coating compositions include benzoin, flow aids or flow control agents which aid the formation of a smooth, glossy surface, stabilizers, pigments and dyes.

The powder coating compositions preferably contain a flow aid, also referred to as flow control or leveling agents, to enhance the surface appearance of cured coatings of the powder coating compositions. Such flow aids typically comprise acrylic polymers and are available from several suppliers, e.g., MODAFLOW from Monsanto Company and ACRONAL from BASF. Other flow control agents which may be used include Modarez MFP available from SYNTHRON, EX 486 available from Troy Chemical, BYK 360P available from BYK Mallinkrodt and PERENOL F-30-P available from Henkel. An example of one specific flow aid is an acrylic polymer having a molecular weight of about 17,000 and containing 60 mole percent 2-ethylhexyl methacrylate residues and about 40 mole percent ethyl acrylate residues. The amount of flow aid present may preferably be in the range of about 0.5 to 4.0 weight percent, based on the total weight of the resin component, and the cross-linking agent.

The powder coating compositions may be deposited on various metallic and non-metallic (e.g., thermoplastic or thermoset composite) substrates by known techniques for powder deposition such as by means of a powder gun, by electrostatic deposition or by deposition from a fluidized bed. In fluidized bed sintering, a preheated article is immersed into a suspension of the powder coating in air. The particle size of the powder coating composition normally is in the range of 60 to 300 microns. The powder is maintained in suspension by passing air through a porous bottom of the fluidized bed chamber. The articles to be coated are preheated to about 250° to 400° F. (about 121° to 205° C.) and then brought into contact with the fluidized bed of the powder coating composition. The contact time depends on the thickness of the coating that is to be produced and typically is from 1 to 12 seconds. The temperature of the substrate being coated causes the powder to flow and thus fuse together to form a smooth, uniform, continuous, uncratered coating. The temperature of the preheated article also effects cross-linking of the coating composition and results in the formation of a tough coating having a good combination of properties. Coatings having a thickness between 200 and 500 microns may be produced by this method.

The compositions also may be applied using an electrostatic process wherein a powder coating composition having a particle size of less than 100 microns, preferably about 15 to 50 microns, is blown by means of compressed air into an applicator in which it is charged with a voltage of 30 to 100 kV by high-voltage direct current. The charged particles then are sprayed onto the grounded article to be coated to which the particles adhere due to the electrical charge thereof. The coated article is heated to melt and cure the powder particles. Coatings of 40 to 120 microns thickness may be obtained.

Another method of applying the powder coating compositions is the electrostatic fluidized bed process which is a combination of the two methods described above. For example, annular or partially annular electrodes are mounted in the air feed to a fluidized bed so as to produce an electrostatic charge such as 50 to 100 kV. The article to be coated, either heated, e.g., 250° to 400° F., or cold, is exposed briefly to the fluidized powder. The coated article then can be heated to effect cross-linking if the article was not preheated to a temperature sufficiently high to cure the coating upon contact of the coating particles with the article.

The powder coating compositions of this invention may be used to coat articles of various shapes and sizes constructed of heat-resistance materials such as glass, ceramic and various metal materials. The compositions are especially useful for producing coatings on articles constructed of metals and metal alloys, particularly steel articles.

As an alternative procedure to the mixing/melt blending/extrusion/grinding procedure, it is also possible to mix and grind the components, preferably using a hammer mill type pulverizer, e.g., a Bantam micro-pulverizer hammer mill fitted with a 0.010" slot screen, operating at a rotor speed of about 8000–14,000 rpms. The composition can then be and jet milled to afford a usable powder composition. The jet milling step is preferably carried out using a fluid energy type mill. In this regard, a Fluid Energy Model 4 Microjet Mill, a 4" mill operating at nominal values of 60–100 psi and 40–70 scfm (standard cubic feet per minute), having a feed rate of 2 to 16 lbs./h is preferred. Alternatively, a TROST Air impact pulverizer, operating at 10–18 scfm (standard cubic feet per minute) at 80–100 psi, having a feed rate of 0.2 to 2 lbs./h can also be utilized. Other air jet mills capable of carrying out this procedure include those manufactured by Micron Powder Systems and Sturtevant.

Further examples of formulation methods, additives, and methods of powder coating application may be found in *User's Guide to Powder Coating*, 2nd Ed., Emery Miller, editor, Society of Manufacturing Engineers, Dearborn, (1987).

The 60 degree gloss is measured using a gloss meter (Gardner Laboratory, Inc., Model GC-9095) according to ASTM D-523.

The test procedure to evaluate the sensitivity of coatings to etching consists of applying 6 drops of 36% $H_2SO_4$ on the coating and heating at 60° C. for 30 minutes and observing any stain developed. The stains are rated according to the following subjective rating scale: 2=severe, 4=pronounced, 6=moderate, 8=slight, and 10=no change.

The coatings of this invention are further illustrated by the following examples.

EXPERIMENTAL SECTION

Example 1

Preparation of Powder Coating Composition Containing 0% of Polyisocyanate HULS 1530

A powder coating composition was prepared from the following materials:

| | |
|---|---|
| 497.1 g | PD 7610 glycidyl copolymer; |
| 102.9 g | Dodecanedioic acid; |
| 6.0 g | Benzoin; and |
| 6.0 g | MODAFLOW III. |

The above material was melt-blended in a APV twin screw extruder at 110° C., ground in a Bantam mill to which a stream of liquid nitrogen is fed, and classified through a 170 mesh screen on a KEK centrifugal sifter. The finely-divided, powder coating composition obtained had an average particle size of about 50 microns.

This powder coating composition was applied electrostatically to one side of the 3 inch by 9 inch panels described hereinabove. The coating was cured (cross-linked) by heating the coated panel at 177° C. in an oven for 20 minutes. The coating on the panel had a pencil hardness of F, a 60° gloss value of 87, and an acid etch rating of 7 at 60° C.

Example 2

Preparation of Powder Coating Based On PD 7610 and Containing 8% Huls 1530

A powder coating composition was prepared from the following materials:

| | |
|---|---|
| 497.1 g | PD 7610 glycidyl copolymer; |
| 102.9 g | Dodecanedioic Acid; |
| 50.0 g | HULS 1530 crosslinker; |
| 6.0 g | Dibutyltin dilaurate; |
| 6.0 g | Benzoin; |
| 6.0 g | MODAFLOW III flow aid. |

Using the procedure of Example 1, panels were coated with this powder coating composition and the coatings cured and evaluated. The coatings have a pencil hardness of F, a 60° gloss value of 94, and an acid etch rating of 7 at 60° C.

Example 3

Preparation of Powder Coating Based On PD 7610 and Containing 14% Huls 1530

A powder coating composition was prepared from the following materials:

| | |
|---|---|
| 497.1 g | PD 7610 glycidyl copolymer; |
| 102.9 g | Dodecanedioic Acid; |
| 100.0 g | HULS 1530; |
| 6.0 g | Dibutyltin dilaurate; |
| 6.0 g | Benzoin; |
| 6.0 g | MODAFLOW III flow aid. |

Using the procedure of Example 1, panels were coated with this powder coating composition and the coatings cured and evaluated. The coatings have a pencil hardness of F, a 60° gloss value of 94, and an acid etch rating of 8 at 60° C.

Example 4

Preparation of Powder Coating Based On PD 7610 and Containing 20% Huls 1530

A powder coating composition was prepared from the following materials:

| | |
|---|---|
| 497.1 g | PD 7610 glycidyl copolymer; |
| 102.9 g | Dodecanedioic Acid; |
| 150.0 g | HULS 1530 crosslinker; |
| 6.0 g | Dibutyltin dilaurate; |
| 6.0 g | Benzoin; |
| 6.0 g | MODAFLOW III flow aid. |

Using the procedure of Example 1, panels were coated with this powder coating composition and the coatings cured and evaluated. The coatings have a pencil hardness of 2 H, a 60° gloss value of 100, and an acid etch rating of 10 at 60° C.

Example 5

Preparation of Powder Coating Based On PD 7610 and Containing 25% Huls 1530

| | |
|---|---|
| 497.1 g | PD 7610 glycidyl copolymer; |
| 102.9 g | Dodecanedioic Acid; |
| 202.0 g | HULS 1530 crosslinker; |
| 6.0 g | Dibutyltin dilaurate; |
| 6.0 g | Benzoin; |
| 6.0 g | MODAFLOW III flow aid. |

Using the procedure of Example 1, panels were coated with this powder coating composition and the coatings cured and evaluated. The coatings have a pencil hardness of 2 H, a 60° gloss value of 102, and an acid etch rating of 10 at 60° C.

Example 6

Preparation of Powder Coating Based On PD 7610 and Containing 30% Huls 1530

A powder coating composition was prepared from the following materials:

| | |
|---|---|
| 497.1 g | PD 7610 glycidyl copolymer; |
| 102.9 g | Dodecanedioic Acid; |
| 252.0 g | HULS 1530 crosslinker; |
| 6.0 g | Dibutyltin dilaurate; |
| 6.0 g | Benzoin; |
| 6.0 g | MODAFLOW III flow aid. |

Using the procedure of Example 1, panels were coated with this powder coating composition and the coatings were cured and evaluated. The coatings have a pencil hardness of 3 H, a 60° gloss value of 99, and an acid etch rating of 10 at 60° C.

Example 7

Preparation of Powder Coating Based On PD 7610 and Containing 32% Huls 1530

A powder coating composition was prepared from the following materials:

| | |
|---|---|
| 497.1 g | PD 7610 glycidyl copolymer; |
| 102.9 g | Dodecanedioic Acid; |
| 275.4 g | HULS 1530 crosslinker; |
| 6.0 g | Dibutyltin dilaurate; |
| 6.0 g | Benzoin; |

9

-continued

| 6.0 g | MODAFLOW III flow aid. |

Using the procedure of Example 1, panels were coated with this powder coating composition and the coatings cured and evaluated. The coatings have a pencil hardness of 3 H, a 60° gloss value of 98, and an acid etch rating of 10 at 60° C.

Example 8

Preparation of Powder Coating Based On PD 1700 and Containing 0% Huls 1530

A powder coating composition was prepared from the following materials:

| 826.9 g | PD 1700 glycidyl copolymer; |
| 173.3 g | Dodecanedioic Acid; |
| 10.0 g | Benzoin; |
| 20.0 g | EX 486 flow aid (Troy Chemical Co.); |
| 10.0 g | TINUVIN 144; and |
| 20.0 g | TINUVIN 234. |

Using the procedure of Example 1, panels were coated with this powder coating composition and the coatings cured and evaluated. The coatings have a pencil hardness of H, a 60° gloss value of 105, and an acid etch rating of 8 at 60° C.

Example 9

Preparation of Powder Coating Based On PD 1700 and Containing 17% Huls 1530

A powder coating composition was prepared from the following materials:

| 826.7 g | PD 1700 glycidyl copolymer; |
| 173.3 g | Dodecanedioic Acid; |
| 210.6 g | Huls 1530 crosslinker; |
| 10.0 g | Dibutyltin dilaurate; |
| 10.0 g | Benzoin; |
| 20.0 g | EX 486 flow aid; |
| 10.0 g | TINUVIN 144; and |
| 20.0 g | TINUVIN 234. |

Using the procedure of Example 1, panels were coated with this powder coating composition and the coatings cured and evaluated. The coatings have a pencil hardness of 3 H, a 60° gloss value of 100, and an acid etch rating of 10 at 60° C.

Example 10

Preparation of Powder Coating Based On PD 6300 and Containing 0% Huls 1530

A powder coating composition was prepared from the following materials:

| 993.0 g | PD 6300 glycidyl copolymer; |
| 207.0 g | Dodecanedioic Acid; |
| 10.0 g | Benzoin; |
| 20.0 g | EX 486 flow aid; |

10

-continued

| 10.0 g | TINUVIN 144; and |
| 20.0 g | TINUVIN 234. |

Using the procedure of Example 1, panels were coated with this powder coating composition and the coatings cured and evaluated. The coatings have a pencil hardness of H, a 60° gloss value of 94, and an acid etch rating of 8 at 60° C.

Example 11

Preparation of Powder Coating Based On PD 6300 and Containing 17% Huls 1530

A powder coating composition was prepared from the following materials:

| 828.4 g | PD 6300 glycidyl copolymer; |
| 171.6 g | Dodecanedioic Acid; |
| 208.5 g | Huls 1530 crosslinker; |
| 10.0 g | Dibutyltin dilaurate; |
| 10.0 g | Benzoin; |
| 20.0 g | EX 486 flow aid; |
| 10.0 g | TINUVIN 144; and |
| 20.0 g | TINUVIN 234. |

Using the procedure of Example 1, panels were coated with this powder coating composition and the coatings cured and evaluated. The coatings have a pencil hardness of H, a 60° gloss value of 103, and an acid etch rating of 10 at 60° C.

TABLE 1

| | Example | | | | | | | | | | |
|---|---|---|---|---|---|---|---|---|---|---|---|
| | 1 | 2 | 3 | 4 | 5 | 6 | 7 | 8 | 9 | 10 | 11 |
| Amount of Polyisocyanate, % | 0 | 8 | 14 | 20 | 25 | 30 | 32 | 0 | 17 | 0 | 17 |
| Acid Etch Rating | 7 | 7 | 8 | 10 | 10 | 10 | 10 | 8 | 10 | 8 | 10 |

We claim:

1. A powder coating composition comprising:
   A. about 55 to 71 weight percent of a glycidyl functionalized acrylic copolymer comprised of:
      1. about 10 to 40 percent by weight, based on the weight of the copolymer, of a monoethylenically unsaturated monomer having at least one epoxy group, and
      2. about 60 to 90 percent by weight, based on the weight of the copolymer, of at least one monoethylenically unsaturated monomer which is free of epoxy groups, wherein the copolymer has a number average molecular weight of about 1,000 to 8,000, a weight average molecular weight of about 2,000 to 16,000 and a glass transition temperature of 40° C. to 90° C., and
   B. about 9 to 14 weight percent of an aliphatic carboxylic acid having 2 or 3 carboxylic acid groups per molecule, and
   C. about 17 to 34 weight percent of a blocked polyisocyanate where the weight percents of A, B and C are based upon the total weight of A, B and C.

2. The composition of claim 1, wherein the glycidyl functionalized acrylic copolymer has a number average molecular weight of about 2,000 to 5,000 and a weight average molecular weight of about 4,000 to 12,000.

3. The composition of claim 1, wherein the aliphatic carboxylic acid is a compound of the formula

wherein n is an integer of from 1 to 10.

4. The composition of claim 1, wherein the aliphatic carboxylic acid is selected from the group consisting of dodecanedioic acid, azelaic acid, adipic acid, 1,6-hexanedioic acid, succinic acid, pimelic acid, sebacic acid, maleic acid, citric acid, itaconic acid and aconitic acid.

5. The composition of claim 1, wherein the aliphatic carboxylic acid is dodecanedioic acid.

6. The composition of claim 1, wherein the aliphatic carboxylic acid is 1,2-, 1,3-, or 1,4-cyclohexanedicarboxylic acid.

7. The composition of claim 1, wherein the aliphatic carboxylic acid is 1,4-cyclohexanedicarboxylic acid.

8. The composition of claim 1, wherein the blocked polyisocyanate is ε-caprolactam-blocked isophorone diisocyanate.

9. The composition of claim 3, wherein the blocked polyisocyanate is ε-caprolactam-blocked isophorone diisocyanate.

10. The composition of claim 2, wherein the aliphatic carboxylic acid is dodecanedioic acid and the blocked polyisocyanate is ε-caprolactam-blocked isophorone diisocyanate.

11. A shaped or formed article coated with the cured composition of claim 1.

12. An automobile part coated with the cured composition of claim 1.

13. The composition of claim 1 wherein the blocked polyisocyanate is a mixture comprised of ε-caprolactam blocked, difunctional, monomeric isophorone diisocyanate and ε-caprolactam-blocked, trifunctional trimer of isophorone diisocyanate.

14. The composition of claim 1 wherein the blocked polyisocyanate is an adduct of 1,3-diazetidine-2,4-dione dimer of isophorone diisocyanate and a diol having the structure:

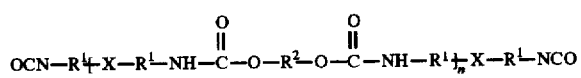

wherein n is greater than or equal to 1 and wherein $R^1$ is a divalent 1-methylene-1,3,3-trimethyl-5-cyclohexyl radical, wherein the radical has the structure:

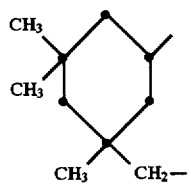

$R^2$ is a divalent aliphatic, cycloaliphatic, araliphatic or aromatic residue of a diol; and X is a 1,3-diazetidine-2,4-dionediyl radical, wherein this radical has the structure:

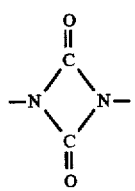

and wherein the ratio of NCO to OH groups in the formation of the adduct is about 1:0.5 to 1:0.9, the mole ratio of diazetidinedione to diol is from 2:1 to 6:5, the content of free isocyanate groups in the adduct is not greater than 8 weight percent and the adduct has a molecular weight of about 500 to 4000 and a melting point of about 70° C. to 130° C.

15. A method for protecting a metal article from acidic corrosion, which comprises applying a powder coating composition comprising:
   A. about 55 to 71 weight percent of a glycidyl functionalized acrylic copolymer comprised of
      1. about 10 to 40 percent by weight, based on the weight of the copolymer, of a monoethylenically unsaturated monomer having at least one epoxy group, and
      2. about 60 to 90 percent by weight, based on the weight of the copolymer, of at least one monoethylenically unsaturated monomer which is free of epoxy groups, wherein the copolymer has a number average molecular weight of about 1,000 to 8,000, a weight average molecular weight of about 2,000 to 16,000 and a glass transition temperature of 40° C. to 90° C., and
   B. about 9 to 14 weight percent of an aliphatic carboxylic acid having 2 or 3 carboxylic acid groups per molecule, and
   C. about 17 to 34 weight percent of a blocked polyisocyanate where the weights of A, B and C are based upon the total weight of A, B and C;
following by heat-curing the coated article.

16. The method of claim 15, wherein the glycidyl functionalized acrylic copolymer has a number average molecular weight of about 2,000 to 5,000 and a weight average molecular weight of about 4,000 to 12,000.

17. The method of claim 15, wherein the aliphatic carboxylic acid is a compound of the formula

wherein n is an integer of from 1 to 10.

18. The method of claim 15, wherein the aliphatic carboxylic acid is selected from the group consisting of dodecanedioic acid, azelaic acid, adipic acid, 1,6-hexanedioic acid, succinic acid, pimelic acid, sebacic acid, maleic acid, citric acid, itaconic acid and aconitic acid.

19. The method of claim 15, wherein the aliphatic carboxylic acid is dodecanedioic acid.

20. The method of claim 15, wherein the aliphatic carboxylic acid is 1,2-, 1,3-, or 1,4-cyclohexanedicarboxylic acid.

21. The method of claim 15, wherein the aliphatic carboxylic acid is 1,4-cyclohexanedicarboxylic acid.

22. The method of claim 15, wherein the blocked polyisocyanate is ε-caprolactam-blocked isophorone diisocyanate.

23. The method of claim 17, wherein the blocked polyisocyanate is ε-caprolactam-blocked isophorone diisocyanate.

24. The method of claim 16, wherein the aliphatic carboxylic acid is dodecanedioic acid and the blocked polyisocyanate is ε-caprolactam-blocked isophorone diisocyanate.

25. The method of claim 15 wherein the blocked polyisocyanate is a mixture comprised of ε-caprolactam blocked, difunctional, monomeric isophorone diisocyanate and ε-caprolactam-blocked, trifunctional trimer of isophorone diisocyanate.

26. The method of claim 15 wherein the blocked polyisocyanate is an adduct of 1,3-diazetidine-2,4-dione dimer of isophorone diisocyanate and a diol having the structure:

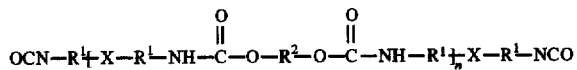

wherein n is greater than or equal to 1 and wherein $R^1$ is a divalent 1-methylene-1,3,3-trimethyl-5-cyclohexyl radical, wherein the radical has the structure:

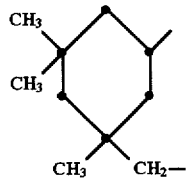

$R^2$ is a divalent aliphatic, cycloaliphatic, araliphatic or aromatic residue of a diol; and X is a 1,3-diazetidine-2,4-dionediyl radical, wherein this radical has the structure:

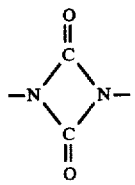

and wherein the ratio of NCO to OH groups in the formation of the adduct is about 1:0.5 to 1:0.9, the mole ratio of diazetidinedione to diol is from 2:1 to 6:5, the content of free isocyanate groups in the adduct is not greater than 8 weight percent and the adduct has a molecular weight of about 500 to 4000 and a melting point of about 70° C. to 130° C.

* * * * *

UNITED STATES PATENT AND TRADEMARK OFFICE
CERTIFICATE OF CORRECTION

PATENT NO. : 5,710,214
DATED : January 20, 1998
INVENTOR(S) : Chou et al.

It is certified that error appears in the above-identified patent and that said Letters Patent is hereby corrected as shown below:

On the title page, item [56] under references cited, please amend the inventor's name in U.S. Patent No. 5,244,944 from "Botl et al." to --Bott et al.--.

Signed and Sealed this

Thirteenth Day of October 1998

Attest:

BRUCE LEHMAN

Attesting Officer

Commissioner of Patents and Trademarks